US012149905B2

(12) United States Patent
Ikeda et al.

(10) Patent No.: US 12,149,905 B2
(45) Date of Patent: Nov. 19, 2024

(54) SPEAKER DEVICE

(71) Applicant: Panasonic Intellectual Property Management Co., Ltd., Osaka (JP)

(72) Inventors: Junichi Ikeda, Kyoto (JP); Shinichiro Kurihara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 190 days.

(21) Appl. No.: 17/914,203

(22) PCT Filed: Oct. 7, 2021

(86) PCT No.: PCT/JP2021/037250
§ 371 (c)(1),
(2) Date: Sep. 23, 2022

(87) PCT Pub. No.: WO2022/176260
PCT Pub. Date: Aug. 25, 2022

(65) Prior Publication Data

US 2023/0112627 A1 Apr. 13, 2023

(30) Foreign Application Priority Data

Feb. 22, 2021 (JP) ................................ 2021-026824

(51) Int. Cl.
*H04R 7/04* (2006.01)
*H04R 1/02* (2006.01)

(52) U.S. Cl.
CPC ............. *H04R 7/045* (2013.01); *H04R 1/025* (2013.01); *H04R 1/028* (2013.01)

(58) Field of Classification Search
None
See application file for complete search history.

(56) References Cited

U.S. PATENT DOCUMENTS 7,535,341 B2 5/2009 Haase
9,807,485 B1 10/2017 Ivey et al.
(Continued)

FOREIGN PATENT DOCUMENTS

JP 11-041685 A 2/1999
JP 2006-140858 A 6/2006
(Continued)

OTHER PUBLICATIONS

International Search Report issued on Jan. 11, 2022 in International Patent Application No. PCT/JP2021/037250, with English translation.

*Primary Examiner* — Paul W Huber
(74) *Attorney, Agent, or Firm* — Rimon P.C.

(57) ABSTRACT

A speaker device includes: a main body part mounted at a predetermined position; a first actuator that is housed in the main body part and generates vibration corresponding to an audio signal that is input; a vibrating body; and vibration transmitting member. The vibrating body vibrates with vibration transmitted from the outside to generate sound. The vibration transmitting member is a string-shaped or rod-shaped member that transmits the vibration generated by the first actuator to the vibrating body. The vibrating body is placed for hanging from the first actuator by the vibration transmitting member.

7 Claims, 6 Drawing Sheets

(56) References Cited

U.S. PATENT DOCUMENTS

| | | | | |
|---|---|---|---|---|
| 9,820,035 | B2 | 11/2017 | Dominijanni et al. | |
| 10,667,037 | B2 * | 5/2020 | Fukuma | H04R 7/12 |
| 2016/0353206 | A1 | 12/2016 | Stahl et al. | |
| 2022/0005446 | A1 | 1/2022 | Nozaki | |

FOREIGN PATENT DOCUMENTS

| | | | |
|---|---|---|---|
| JP | 2008-243580 | A | 10/2008 |
| JP | 2017-182963 | A | 10/2017 |
| JP | 2020-155917 | A | 9/2020 |

* cited by examiner

SPEAKER DEVICE

CROSS-REFERENCE OF RELATED APPLICATIONS

This application is the U.S. National Phase under 35 U.S.C. § 371 of International Patent Application No. PCT/JP2021/037250, filed on Oct. 7, 2021, which in turn claims the benefit of Japanese Patent Application No. 2021-026824, filed on Feb. 22, 2021, the entire disclosures of which Applications are incorporated by reference herein.

TECHNICAL FIELD

The present disclosure relates to a speaker device.

BACKGROUND ART

Patent Literature (PTL) 1 discloses a lighting fixture including a light source, a speaker unit disposed on the opposite side of the light source from its light emission direction, and a fixture main body that houses the light source and the speaker unit. This lighting fixture is, for example, a lighting fixture called a downlight, which is embedded in a mounting hole provided in a ceiling or the like of a building and can output light from the light source and sound from the speaker unit downward (to a floor or the like).

CITATION LIST

Patent Literature

[PTL 1] Japanese Unexamined Patent Application Publication No. 2017-182963

SUMMARY OF INVENTION

Technical Problem

The present disclosure provides a speaker device having good spatial efficiency and capable of outputting sound over a wide range.

Solution to Problem

A speaker device in the present disclosure includes: a main body part mounted at a predetermined position; a first actuator that is housed in the main body part and generates vibration corresponding to an audio signal that is input; a vibrating body that vibrates with vibration transmitted from the outside to generate sound; and a first vibration transmitting member having a string shape or a rod shape, the first vibration transmitting member transmitting the vibration generated by the first actuator to the vibrating body. The vibrating body is placed for hanging from the first actuator by the first vibration transmitting member.

Advantageous Effects of Invention

According to the present disclosure, it is possible to provide a speaker device having good spatial efficiency and capable of outputting sound over a wide range.

DESCRIPTION OF EMBODIMENTS

Figure 1:
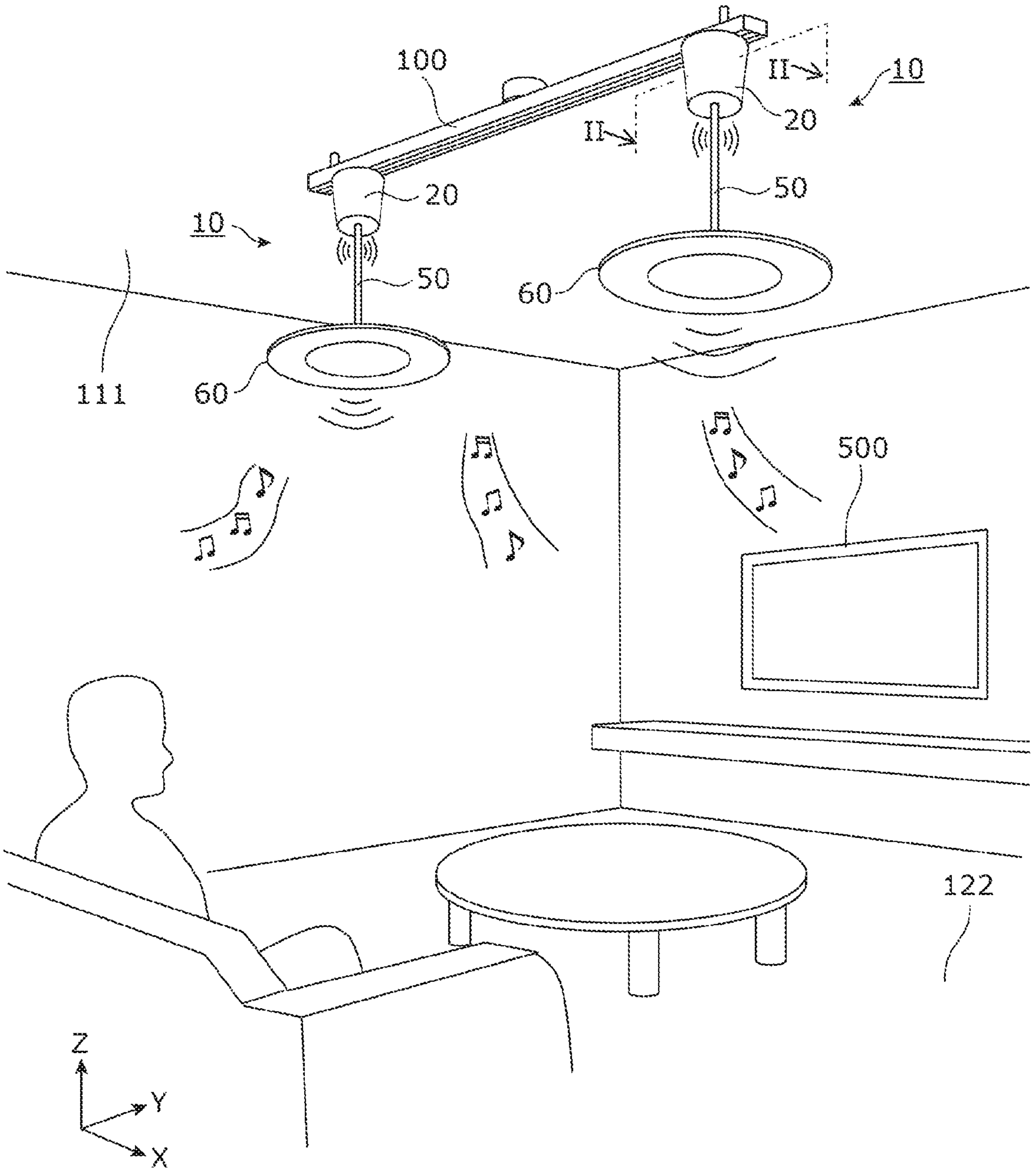
FIG. 1 is a perspective view illustrating an installation example of a speaker device according to the embodiment.

The inventors of the present application have found that the following problems occur in the conventional speaker device. Conventionally, as a device for outputting sound such as music or audio of video content, there is a speaker device including a speaker unit and a box-shaped enclosure to which the speaker unit is fixed. In a case where the conventional speaker device is disposed in a room such as a living room, the speaker device may be fixed to a ceiling. This makes it possible to dispose the speaker device in the room without consuming space on the floor surface. However, in this case, it is necessary to newly provide a screw hole or the like for the fixing of the speaker device in the ceiling. The new placement of the speaker device in the upper space in the room may give a feeling of oppression or discomfort to a person present in the room. In this regard, in the case of a lighting fixture with a built-in speaker unit such as the conventional lighting fixture described above, a device for outputting sound can be disposed on the ceiling by using an existing adapter or the like for the lighting fixture, which is provided on the ceiling. The lighting fixture with the built-in speaker unit is apparently a general lighting fixture, and hence it is unlikely that the presence of the lighting fixture gives a feeling of oppression or discomfort to a person in the room.

However, in the case of the conventional lighting fixture with the built-in speaker unit described above, sound is output from the periphery of an optical member such as a lens from which illumination light is emitted in front view (when viewed from the emission direction of the illumination light). For this reason, a sound output area is relatively small, which results in a problem such as difficulties in obtaining relatively loud sound or a narrow arrival range of sound.

The present disclosure has been made based on such knowledge, and as a result of intensive studies by the inventors of the present application, an idea for a structure of a speaker device having good spatial efficiency and capable of outputting sound over a wide range has been obtained.

Embodiments (including variations) will be described below with reference to the drawings as appropriate. However, a more detailed description than necessary may be omitted. For example, in some cases, a detailed description of a well-known matter or a repeated description of substantially the same configuration may be omitted. This is to avoid making the following description unnecessarily redundant and to facilitate the understanding of those skilled in the art.

The inventors of the present application provide the accompanying drawings and the following description in order for those skilled in the art to fully understand the present disclosure, and do not intend to limit the claimed subject matter by these drawings and description.

In the following embodiments, for convenience of description, the vertical direction corresponds to the Z-axis direction, the front-rear direction corresponds to the Y-axis direction, and the left-right direction (lateral direction) corresponds to the X-axis direction. However, these correspondences do not limit the orientation of the speaker device according to the present disclosure at the time of manufacturing or use thereof. In the following description, for example, the X-axis plus direction indicates an arrow direction of the X-axis, and the X-axis minus direction indicates a direction opposite to the X-axis plus direction. The same applies to the Y-axis direction and the Z-axis direction. Each of the drawings is a schematic drawing and is not necessarily exactly illustrated. Accordingly, the scales and the like are not necessarily the same in the drawings.

Embodiment

Hereinafter, speaker device 10 according to an embodiment will be described with reference to FIGS. 1 to 3. First, the outline of the configuration of speaker device 10 according to the embodiment will be described with reference to FIG. 1.

1-1. Overall Configuration of Speaker Device

FIG. 1 is a perspective view illustrating an installation example of speaker device 10 according to the embodiment. As illustrated in FIG. 1, speaker device 10 according to the present embodiment includes main body part 20, vibrating body 60, and vibration transmitting member 50 that connects main body part 20 and vibrating body 60. Main body part 20 incorporates an actuator for outputting sound, which will be described later, and the actuator vibrates vibrating body 60 via string-shaped or rod-shaped vibration transmitting member 50 to cause vibrating body 60 to generate sound. Vibration transmitting member 50 is an example of a first vibration transmitting member.

In the present embodiment, vibrating body 60 is a relatively thin disk-shaped lighting fixture and has a function of emitting illumination light. That is, vibrating body 60 itself is a lighting fixture having no function as an ordinary speaker that operates as a single unit, such as an actuator for outputting sound. Vibrating body 60 can function as a diaphragm that is excited by an external actuator to generate sound. Main body part 20 is provided with, for example, a wireless communicator (not illustrated) and can receive an audio signal transmitted by wireless communication from, for example, a user's portable terminal or television 500. The actuator is operated by the audio signal, whereby sound (music, audio, etc.) based on the audio signal is reproduced (output) by the vibration of vibrating body 60.

More specifically, in speaker device 10 according to the present embodiment, main body part 20 is slidably mounted on rail member 100, installed on ceiling 111, along the rail of rail member 100. Thus, speaker device 10 is placed for hanging from ceiling 111. That is, vibrating body 60 having a lighting function is placed for hanging from ceiling 111 and emits illumination light toward floor surface 122 in the same form as in a case where vibrating body 60 is disposed as a lighting fixture. Rail member 100 is engaged with an adapter for a lighting fixture, which is embedded in ceiling 111, and can thus receive electric power from the adapter. Moreover, when electrical equipment such as a lighting fixture is mounted on rail member 100, rail member 100 can supply the electrical equipment with electric power necessary for its operation. That is, main body part 20 slidably mounted on rail member 100 can receive electric power for outputting sound and illumination light from rail member 100. Main body part 20 supplies vibrating body 60 with electric power for lighting via vibration transmitting member 50 that is a string-shaped or rod-shaped member. In other words, in the present embodiment, vibration transmitting member 50 serves to supply electric power from main body part 20 to vibrating body 60 in addition to serving to transmit the vibration from main body part 20 to vibrating body 60.

1-2. Details of Speaker Device

Next, a more detailed configuration of speaker device 10 configured as described above will be described with reference to FIGS. 2 and 3. FIG. 2 is a cross-sectional view illustrating the outline of the internal configuration of main body part 20 in speaker device 10 according to the embodiment. In FIG. 2, the main components inside casing 21 of main body part 20 are simply illustrated in a state where casing 21 has been cut in the XZ plane passing through line II-II of FIG. 1. Rail member 100 is also simply illustrated in a state where a part of rail member 100 has been cut in the XZ plane. FIG. 3 is a view illustrating the outline of the configuration of actuator 40 according to the embodiment. In FIG. 3, only one (first actuator 40*a*) of two actuators 40 in main body part 20 is illustrated in a simplified cross-sectional view.

Figure 2:
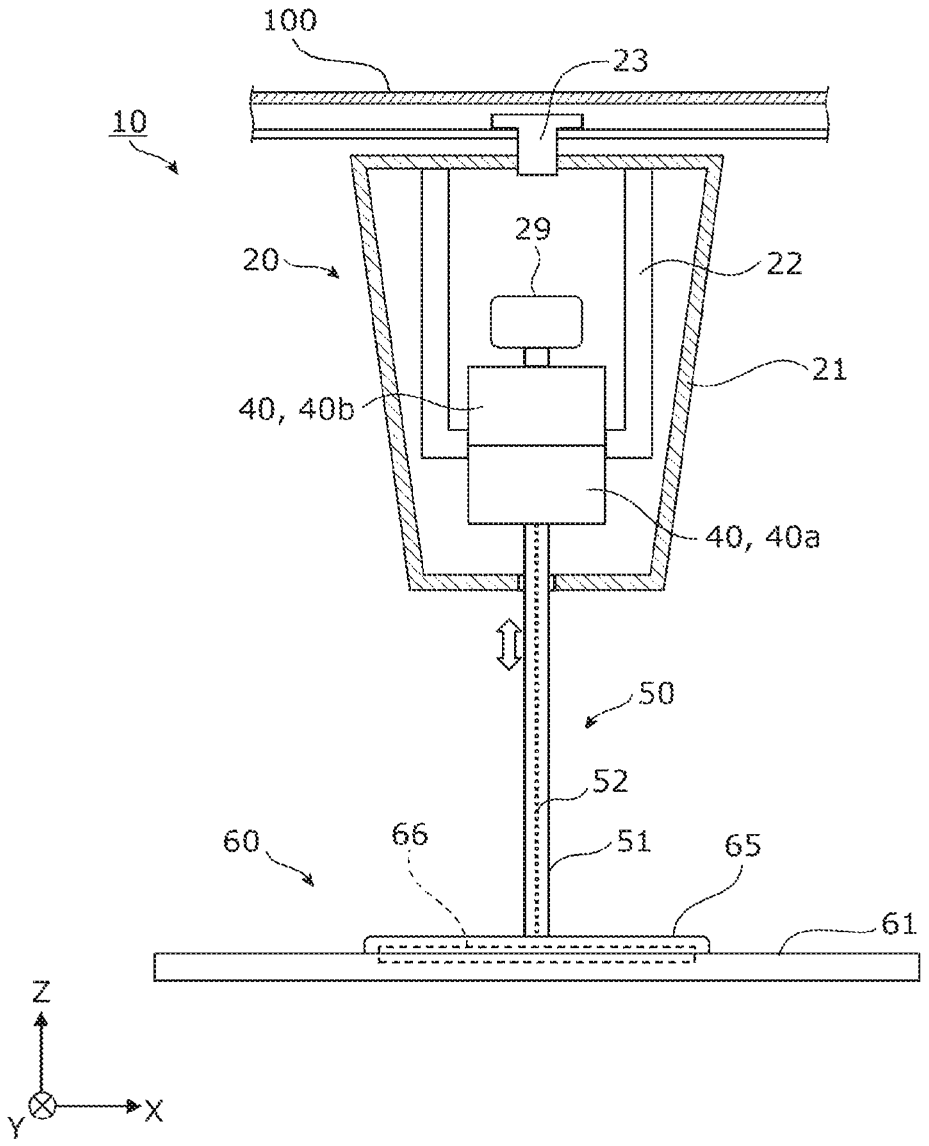
FIG. 2 is a cross-sectional view illustrating an outline of an internal configuration of a main body part in a speaker device according to the embodiment.
Figure 3:
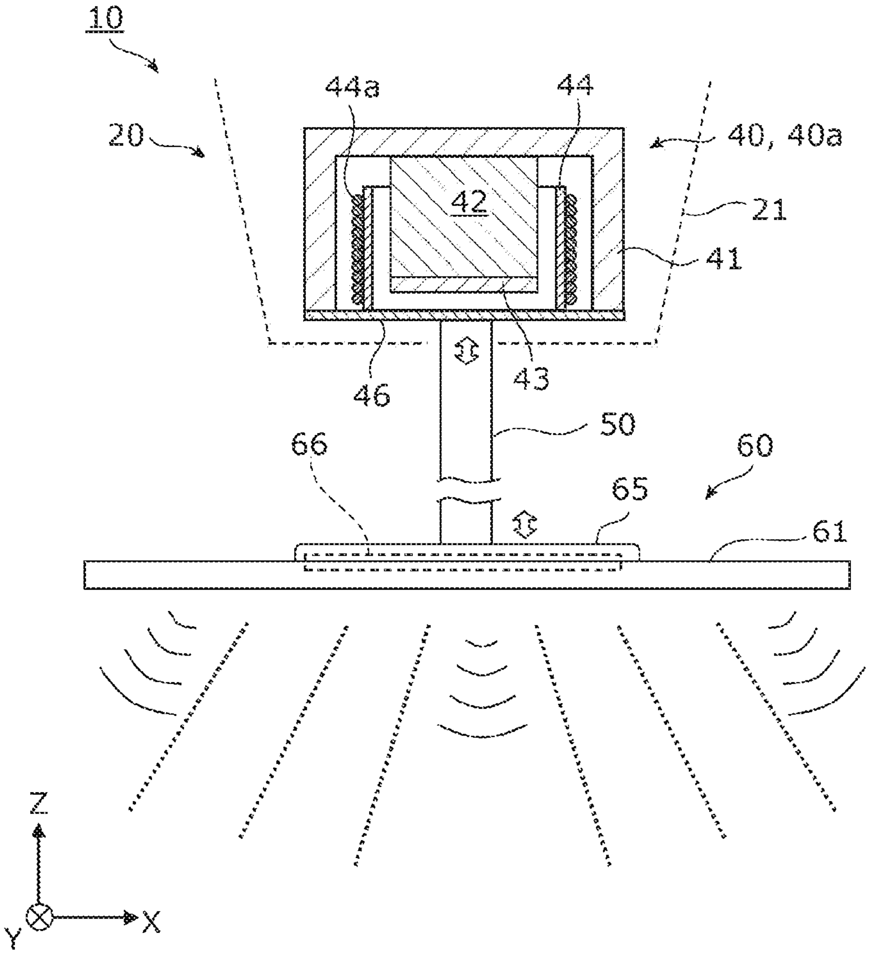
FIG. 3 is a diagram illustrating an outline of a configuration of an actuator according to the embodiment.

As illustrated in FIGS. 2 and 3, main body part 20 includes casing 21 and actuator 40 fixed inside casing 21 by fixing member 22. In the present embodiment, first actuator 40*a* and second actuator 40*b*, both of which are actuators 40 of the same type, are fixed to casing 21 by fixing member 22. First actuator 40*a* is actuator 40 for exciting vibrating body 60. Second actuator 40*b* is actuator 40 disposed in such an orientation to vibrate in a direction opposite to first actuator 40*a*. That is, main body part 20 includes two actuators 40 having the same structure and different roles from each other. In order to distinguish between these two actuators 40, one of two actuators 40 is named first actuator 40*a*. The other of two actuators 40 is named second actuator 40*b*.

As illustrated in FIG. 3, these actuators 40 each have metal yoke 41, cylindrical magnet 42 fixed to the inner bottom surface of yoke 41 having a bottomed cylindrical shape, metal plate 43 fixed to the end surface of magnet 42, coil bobbin 44 having voice coil 44*a*, and diaphragm 46 to which coil bobbin 44 is fixed. Magnet 42 is fixed to the inner bottom surface of yoke 41 having a bottomed cylindrical shape, and coil bobbin 44 is disposed in a magnetic gap between the outer peripheral surface of magnet 42 and the inner peripheral surface of yoke 41. A current corresponding to an audio signal flows through voice coil 44*a* of actuator 40 configured as described above, whereby coil bobbin 44 vibrates up and down (in the Z-axis direction). This leads to the vibration of diaphragm 46 that is a member having the shape of a plate spring. In the present embodiment, vibration transmitting member 50 is fixed to the opposite surface of diaphragm 46 from the surface to which voice coil 44*a* is fixed, with the longitudinal direction of vibration transmitting member 50 directed to the vibration direction of diaphragm 46. Accordingly, vibration transmitting member 50 vibrates with the vibration of diaphragm 46, and as a result, vibrating body 60 connected to the lower end of vibration transmitting member 50 also vibrates. That is, vibrating body 60 vibrates with the vibration of diaphragm 46 that vibrates in accordance with the audio signal input to actuator 40, and as a result, vibrating body 60 generates sound corresponding to the audio signal.

Two actuators 40 (first actuator 40*a* and second actuator 40*b*) thus configured are disposed with the directions of respective diaphragms 46 opposite to each other. In the present embodiment, first actuator 40*a* and second actuator 40*b* are disposed in a state where the outer bottom surfaces of respective yokes 41 abut each other, and are fixed to casing 21 by fixing member 22. The same audio signals are input in parallel to first actuator 40*a* and second actuator 40*b*, resulting in that first actuator 40*a* and second actuator 40*b* vibrate synchronously and in opposite directions. Thus, when only first actuator 40*a* operates, the vibration that first actuator 40*a* applies to main body part 20 is reduced by the vibration of second actuator 40*b*. More specifically, diaphragm 46 of second actuator 40*b* is connected to weight member 29 (see FIG. 2) having a weight corresponding to the weight of vibrating body 60 hung by first actuator 40*a*. That is, when the weight of vibration transmitting member 50 is small enough to be negligible, the weight of weight member 29 is equal to the weight of vibrating body 60, and when the weight of vibration transmitting member 50 is large enough not to be negligible, the weight of weight member 29 is the total weight of vibration transmitting member 50 and vibrating body 60. This makes the vibration modes of first actuator 40*a* and second actuator 40*b* closer to each other. As a result, the vibration applied to main body part 20 by first actuator 40*a* is reduced more efficiently.

It is desirable that the audio signals input to first actuator 40*a* and second actuator 40*b* be the same from the viewpoint of efficiently reducing the vibration of main body part 20. However, the audio signals input to first actuator 40*a* and second actuator 40*b* need not be the same. For example, it is assumed that a first audio signal is input to first actuator 40*a* and a second audio signal is input to second actuator 40*b*. In this case, the first audio signal and the second audio signal may have the same phase but different amplitudes. For example, the first audio signal and the second audio signal may have the same amplitude and slightly shifted phases. In either case, at least a part of the vibration applied to main body part 20 by first actuator 40*a* is canceled by the vibration of second actuator 40*b*. That is, second actuator 40*b* is only required to be vibrated so that the vibration applied to main body part 20 by first actuator 40*a* can be reduced as much as possible. Therefore, the first audio signal and the second audio signal need not be completely the same.

The weight of weight member 29 or the total weight of weight member 29 and vibration transmitting member 50 may not be the same as the weight of vibrating body 60. That is, even when these are not the same, the vibration mode of second actuator 40*b* can be made close to the vibration mode of first actuator 40*a* by using the load of weight member 29 connected to second actuator 40*b*. This makes it possible to improve the effect of reducing the vibration of main body part 20 as compared with a case where weight member 29 is not provided. The vibration of main body part 20 cannot always be reduced most when the weight of weight member 29 or the total weight of weight member 29 and vibration transmitting member 50 is completely the same as the weight of vibrating body 60. Thus, for example, the weight of weight member 29 capable of reducing the vibration of main body part 20 the most may be determined by conducting an experiment in which the vibration of main body part 20 is measured while the weight of weight member 29 is changed.

The configuration of actuator 40 illustrated in FIG. 3 is an example, and the placement layout, shape, size, and the like of the yoke, the magnet, the voice coil, and the like only need to be appropriately determined in accordance with the performance and the like required for speaker device 10. The driving method of diaphragm 46 is not particularly limited. That is, an actuator with any structure may be employed as the actuator for exciting vibrating body 60 so long as being capable of vibrating diaphragm 46 in accordance with an input audio signal.

As illustrated in FIG. 3, vibrating body 60 includes vibrating body main body 61 and illuminator 65 disposed at a central portion of vibrating body main body 61. Illuminator 65 includes light-emitting module 66 having a plurality of light-emitting elements (not illustrated) such as a plurality of Light-emitting diodes (LEDs). Light-emitting module 66 emits light by electric power supplied from main body part 20 via vibration transmitting member 50. Vibrating body main body 61 is formed of, for example, resin with light-transmissive properties, glass, or the like and emits light emitted from illuminator 65 downward.

In the present embodiment, vibration transmitting member 50 is a rod-shaped member as illustrated in FIG. 2. Specifically, vibration transmitting member 50 includes cylindrical body 51, which is a cylindrical rod body mainly serving to transmit vibration, and electric wire 52 inserted into cylindrical body 51. That is, cylindrical body 51 also functions as a cover for covering electric wire 52. Cylindrical body 51 is formed of metal, such as aluminum, and has rigidity capable of transmitting the vibration of actuator 40 to vibrating body 60.

Vibration transmitting member 50 may be a string-shaped member. For example, vibration transmitting member 50 may be realized by electric wire 52 itself, which is a covered electric wire. That is, even when electric wire 52 has flexibility (low rigidity), a tension equal to the weight (mass×gravitational acceleration) of vibrating body 60 is generated in electric wire 52 by hanging vibrating body 60. This brings electric wire 52 into a state capable of transmitting the vibration of first actuator 40*a* to vibrating body 60. Vibration transmitting member 50 may only have a function of transmitting the vibration of first actuator 40*a* to vibrating body 60, such as cylindrical body 51 or a solid shaft body. In this case, electric wire 52 is only required to connect main body part 20 and vibrating body 60 in the outside of vibration transmitting member 50.

As described above, main body part 20 for supporting vibrating body 60 in the state of being hung by vibration transmitting member 50 is mounted on rail member 100. In the present embodiment, main body part 20 includes mounting member 23 slidable in the state of being engaged with rail member 100. Mounting member 23 has a conductive member for receiving electric power from rail member 100 and passing the received electric power to a power supply circuit (not illustrated) housed in main body part 20. That is, main body part 20 is mechanically and electrically connected to rail member 100 via mounting member 23. This enables speaker device 10 to receive electric power necessary for its operation from rail member 100 and change its position along the extending direction of rail member 100. Fixing member 22 may be coupled to mounting member 23. That is, first actuator 40*a* and second actuator 40*b* may be fixed to mounting member 23 via fixing member 22. In this case, the loads of first actuator 40*a* and second actuator 40*b* are supported by mounting member 23 without using casing 21. This, for example, makes the vibration of first actuator 40*a* less likely to be transmitted to casing 21, resulting in a reduction in the vibration of casing 21. For example, casing 21 can be formed of a member having relatively low strength (soft or thin resin, etc.).

As described above, speaker device 10 according to the present embodiment includes: main body part 20 mounted at a predetermined position; first actuator 40*a* that is housed in main body part 20 and generates vibration corresponding to an input audio signal; vibrating body 60; and vibration transmitting member 50. Vibrating body 60 vibrates with vibration transmitted from the outside to generate sound. Vibration transmitting member 50 is a string-shaped or rod-shaped member that transmits the vibration generated by first actuator 40*a* to vibrating body 60. Vibrating body 60 is placed for hanging from first actuator 40*a* by vibration transmitting member 50.

As described above, in speaker device 10 according to the present embodiment, sound can be generated by vibrating body 60 in the hung state. Thus, for example, sound can be generated using the whole of vibrating body 60. Accordingly, by disposing speaker device 10 on ceiling 111 of a room such as a living room or a bedroom, sound can be output toward a wide range centered directly under speaker device 10 without consuming space on floor surface 122. Vibrating body 60 may be any member so long as the member vibrates with an external force received from vibration transmitting member 50, and vibrating body 60 has a structure without an actuator that excites vibrating body 60. Hence a relatively thin member can be employed as vibrating body 60. Therefore, according to speaker device 10 in the present embodiment, as compared with a case where the conventional speaker device including the speaker unit, the enclosure, and the like is hung from a ceiling, it is possible to reduce a feeling of oppression or discomfort that speaker device 10 gives to a person present in the room.

As described above, speaker device 10 according to the present embodiment is a speaker device having good spatial efficiency and capable of outputting sound over a wide range.

In the present embodiment, vibrating body 60 includes illuminator 65 that emits illumination light. Vibration transmitting member 50 includes electric wire 52 that supplies first actuator 40*a* with electric power for first actuator 40*a* to operate.

As described above, in the present embodiment, vibration transmitting member 50 for transmitting the vibration of first actuator 40*a* to vibrating body 60 has a function of supplying vibrating body 60 having the lighting function with electric power for outputting the illumination light. That is, sound can be output from the lighting fixture (vibrating body 60) that is apparently hung by only one member. Vibrating body 60 may be provided with another type of electrical equipment, such as a sensor for detecting temperature, humidity, or person, or a blower, instead of or in addition to illuminator 65. It is not essential for vibrating body 60 to include electrical equipment, and for example, a single plate-shaped member may be employed as vibrating body 60.

In the present embodiment, main body part 20 further houses second actuator 40*b* that generates vibration, corresponding to an audio signal, in a direction opposite to the direction of the vibration generated by first actuator 40*a*. Specifically, actuator 40 being the same as first actuator 40*a* is disposed in a direction opposite to first actuator 40*a* to obtain second actuator 40*b* that generates vibration in a direction opposite to the direction of the vibration generated by first actuator 40*a*.

With this configuration, in main body part 20, the vibration applied to main body part 20 by first actuator 40*a* is reduced by the vibration in the opposite direction generated by second actuator 40*b*. As a result, the possibility of occurrence of a fault such as generation of abnormal sound due to the vibration of main body part 20 or ceiling 111, for example, is reduced. The vibration of first actuator 40*a* is efficiently used for the vibration of vibrating body 60 (i.e., generation of sound), which can result in an increase in the volume of sound that can be output by speaker device 10.

More specifically, speaker device 10 according to the present embodiment further includes weight member 29 that vibrates with the vibration of second actuator 40*b* and has a weight corresponding to the weight of vibrating body 60.

This makes the vibration modes of first actuator 40*a* and second actuator 40*b* closer to each other. Therefore, the effect of canceling the vibration by second actuator 40*b* is improved. As a result, it is possible to more reliably achieve the effects of reducing a fault caused by the vibration of main body part 20, increasing the volume of sound that can be output, and the like.

In the present embodiment, main body part 20 includes mounting member 23. Mounting member 23 is a member for mounting main body part 20 on rail member 100 fixed to ceiling 111. Mounting member 23 can move along the longitudinal direction of rail member 100 and receive electric power supply from rail member 100.

Accordingly, speaker device 10 can be moved to an arbitrary position along rail member 100. Therefore, in the room where rail member 100 is disposed, it is possible to easily change a position at which sound is output from directly above (i.e., the position of speaker device 10 in plan view).

Speaker device 10 according to the embodiment has been described above. However, the configuration of speaker device 10 is not limited to the configuration illustrated in FIGS. 1 to 3. For example, speaker device 10 can generate sound by using a vibrating body in a different form from vibrating body 60. Various variations of vibrating body 60 will be described below, focusing on differences from the embodiment described above.

2-1. Variation 1

Figure 4:
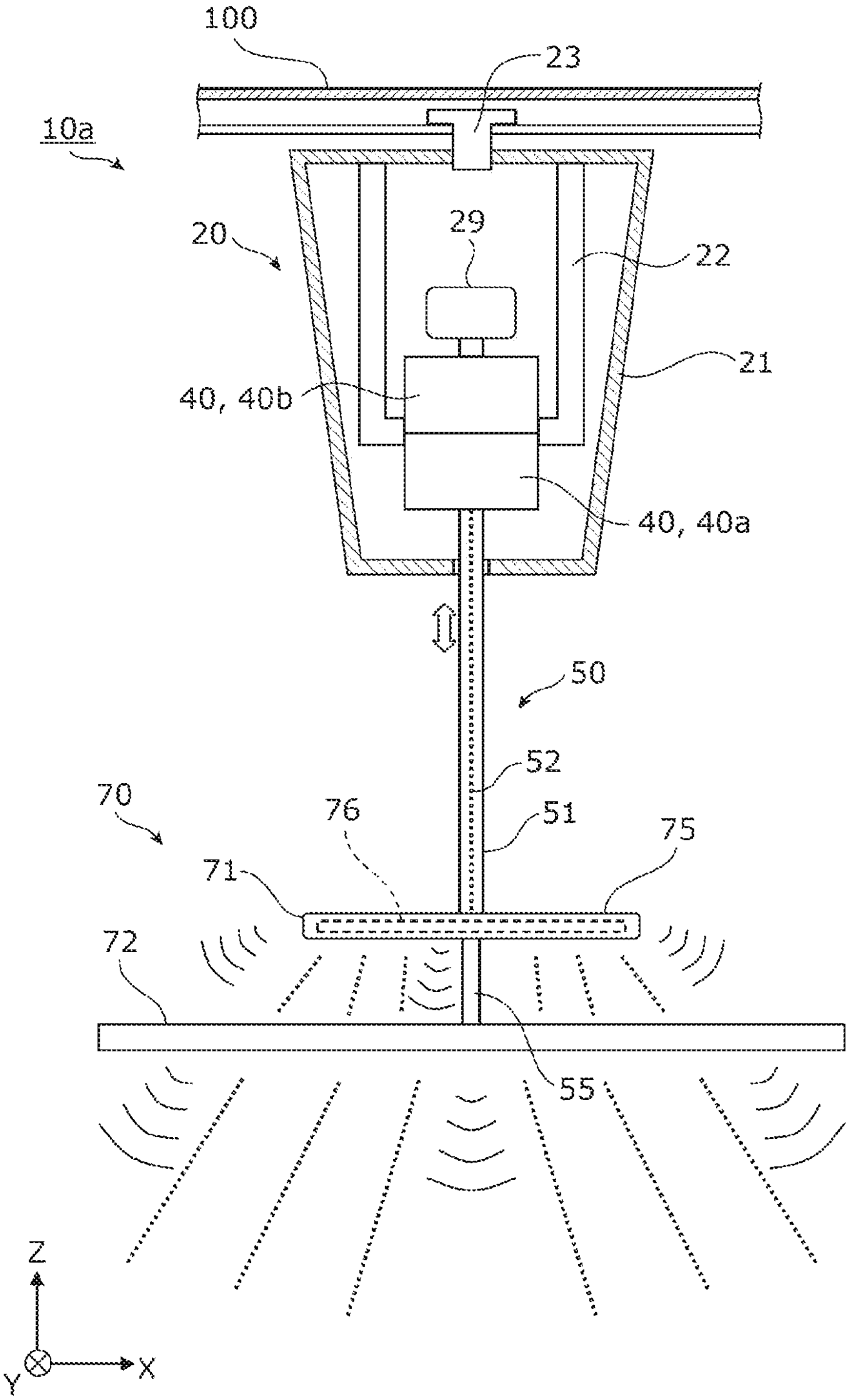
FIG. 4 is a diagram illustrating an outline of a configuration of a speaker device according to Variation 1 of the embodiment.

FIG. 4 is a diagram illustrating an outline of a configuration of speaker device 10*a* according to Variation 1 of the embodiment. In FIG. 4, casing 21 of main body part 20 and rail member 100 are illustrated in cross section as in FIG. 2. This also applies to FIGS. 5 and 6, which will be described later.

Speaker device 10*a* illustrated in FIG. 4 includes: main body part 20 mounted on rail member 100; first actuator 40*a* that is housed in main body part 20 and generates vibration corresponding to an input audio signal; vibrating body 70; and vibration transmitting member 50. Vibrating body 70 is placed for hanging from first actuator 40*a* by vibration transmitting member 50. These configurations are common to speaker device 10 according to the embodiment.

Speaker device 10*a* according to the present variation is different from speaker device 10 according to the embodiment in that vibrating body 70 includes first vibrating body 71 and second vibrating body 72. Specifically, vibrating body 70 includes first vibrating body 71 connected to vibration transmitting member 50 and second vibrating body 72 disposed below first vibrating body 71. Vibrating body 70 further includes string-shaped or rod-shaped vibration transmitting member 55 that connects first vibrating body 71 and second vibrating body 72 and transmits the vibration generated by first actuator 40*a* to second vibrating body 72. In the present variation, the vibration generated by first actuator 40*a* is transmitted to first vibrating body 71 and is transmitted to second vibrating body 72 via first vibrating body 71 and vibration transmitting member 55. Vibration transmitting member 55 is an example of a second vibration transmitting member.

More specifically, in the present variation, vibration transmitting member 55 is disposed on the same axis as vibration transmitting member 50 that directly receives the vibration of first actuator 40*a*, so that vibration transmitting member 55 can efficiently receive the vibration of first actuator 40*a*. As a result, the volume of sound due to the vibration of second vibrating body 72 becomes relatively large.

Second vibrating body 72 is larger in size in plan view than first vibrating body 71 and is larger in weight than first vibrating body 71. This makes first vibrating body 71 apt to emit a sound with a relatively high frequency and second vibrating body 72 apt to emit a sound with a relatively low frequency. As a result, for example, as a synthesized sound of the sound generated by first vibrating body 71 and the sound generated by second vibrating body 72, a sound mixed in a well-balanced manner from a low sound range to a high sound range can be obtained.

In the present variation, first vibrating body 71 is disc-shaped light-emitting device 75 including light-emitting module 76, and has a function of emitting illumination light, like illuminator 65 according to the embodiment. The electric power for light-emitting module 76 to emit light is supplied from main body part 20 via electric wire 52 provided in vibration transmitting member 50. Second vibrating body 72 is a disc-shaped diffusion plate for transmitting and diffusing the illumination light emitted from first vibrating body 71 and is formed of, for example, milky white resin. That is, vibrating body 70 according to the present variation is a lighting fixture that can emit illumination light and generate sound by vibration, like vibrating body 60 according to the embodiment. Second vibrating body 72 may also have the function of emitting illumination light. For example, by disposing a plurality of light-emitting elements such as LEDs on the outer periphery of second vibrating body 72 not overlapping with first vibrating body 71 in plan view, vibrating body 70, which is a lighting fixture, can emit illumination light in a wider range, for example.

Vibrating body 70 may not have the function of emitting illumination light. That is, each of first vibrating body 71 and second vibrating body 72 may be any member so long as the member vibrates to generate sound. Vibration transmitting member 50 may penetrate first vibrating body 71 and be connected to second vibrating body 72. This makes it possible to more efficiently transmit the vibration of first actuator 40*a* to second vibrating body 72. In this case, the portion of vibration transmitting member 50 connecting first actuator 40*a* and first vibrating body 71 is a first vibration transmitting member, and the portion of vibration transmitting member 50 connecting first vibrating body 71 and second vibrating body 72 is a second vibration transmitting member.

The material, shape, and the like of vibration transmitting member 55 are not particularly limited. Similarly to vibration transmitting member 50, vibration transmitting member 55 may be, for example, a tubular body made of metal such as aluminum, or may be, for example, a string (wire) made of metal or resin.

2-2. Variation 2

Figure 5:
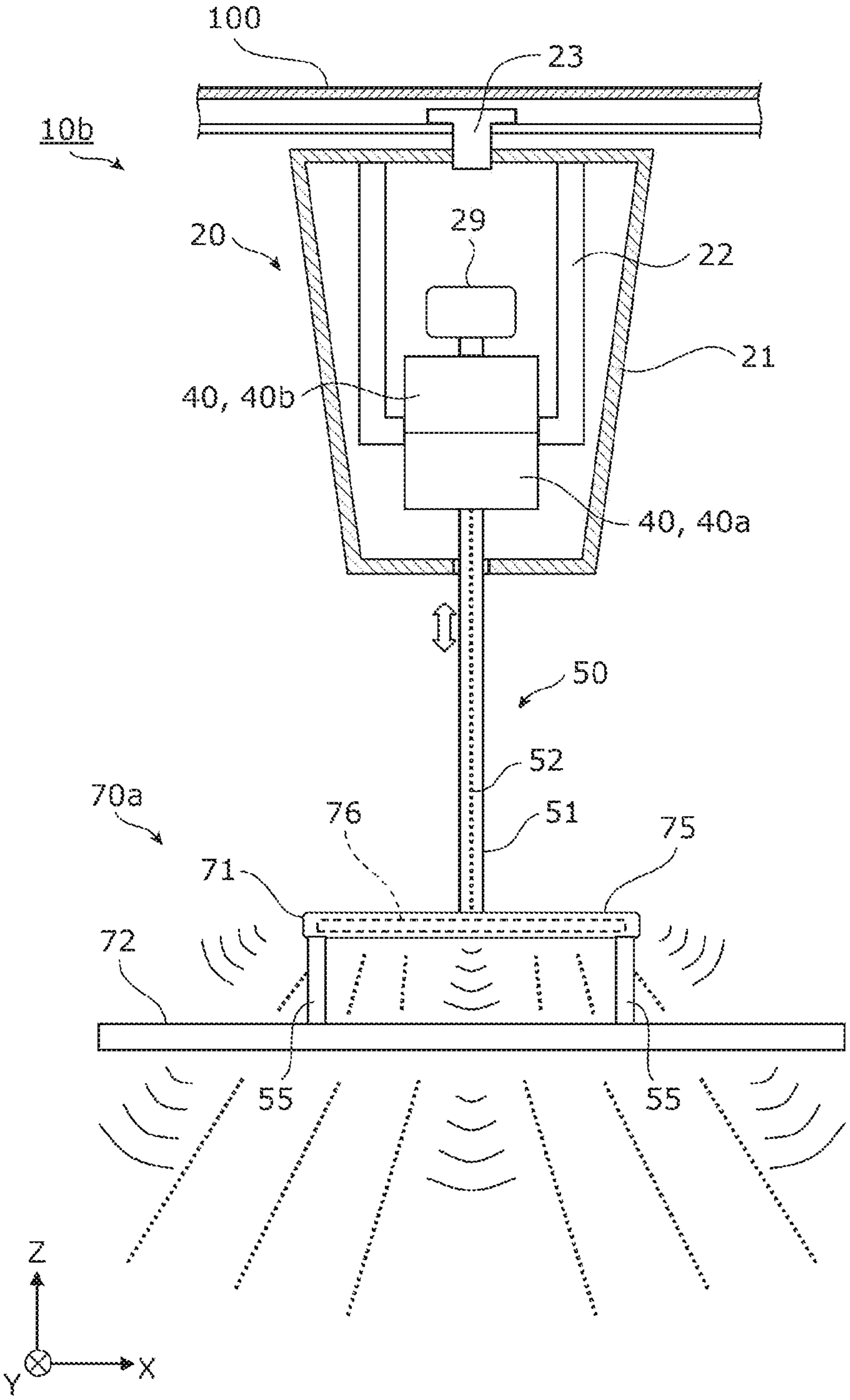
FIG. 5 is a diagram illustrating an outline of a configuration of a speaker device according to Variation 2 of the embodiment.

FIG. 5 is a diagram illustrating an outline of a configuration of speaker device 10*b* according to Variation 2 of the embodiment. Speaker device 10*b* according to the present variation is provided with vibrating body 70*a*, and vibrating body 70*a* includes first vibrating body 71 and second vibrating body 72 disposed side by side in the vertical direction, like vibrating body 70 according to Variation 1. The present variation is different from Variation 1 in that first vibrating body 71 and second vibrating body 72 are connected by a plurality of vibration transmitting members 55.

With this configuration, vibration transmitting member 55 is not positioned at the center of first vibrating body 71 that is disc-shaped light-emitting device 75 in plan view. This makes a shadow caused by vibration transmitting member 55 less likely to appear directly under speaker device 10*b*. The suspension of second vibrating body 72 from first vibrating body 71 by the plurality of vibration transmitting members 55 facilitates stabilizing the orientation of second vibrating body 72. Although two vibration transmitting members 55 connecting first vibrating body 71 and second vibrating body 72 are illustrated in FIG. 5, the number of vibration transmitting members 55 may be three or more.

2-3. Variation 3

Figure 6:
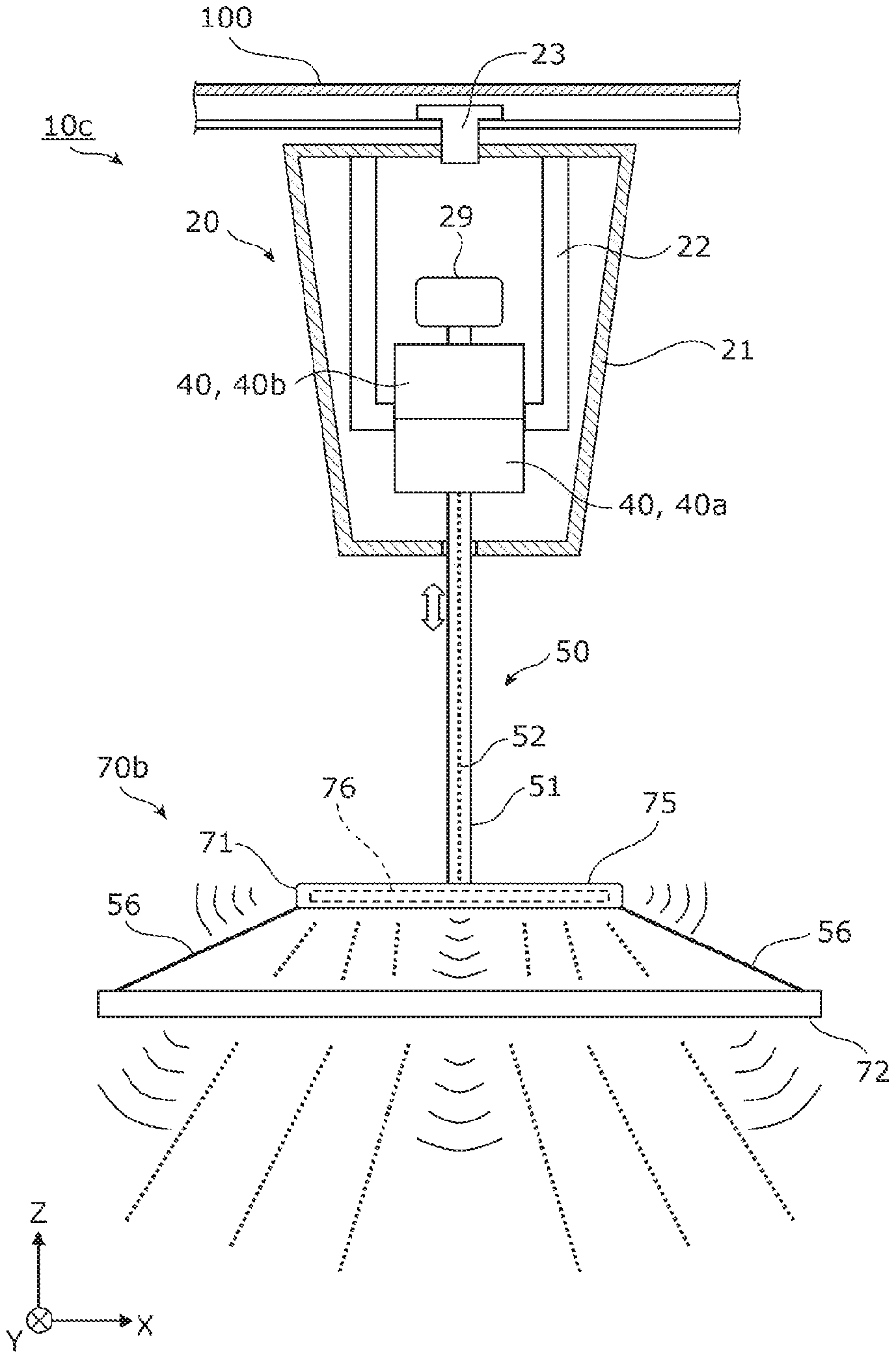
FIG. 6 is a diagram illustrating an outline of a configuration of a speaker device according to Variation 3 of the embodiment.

FIG. 6 is a diagram illustrating an outline of a configuration of speaker device 10*c* according to Variation 3 of the embodiment. Speaker device 10*c* according to the present variation includes vibrating body 70*b*. Vibrating body 70*b* includes first vibrating body 71 and second vibrating body 72 disposed side by side in the vertical direction, like vibrating body 70 according to Variation 1. The present variation is different from Variation 1 in that the peripheral edge of first vibrating body 71 and the peripheral edge of second vibrating body 72 are connected by a plurality of vibration transmitting members 56. Specifically, vibration transmitting member 56 is a string (wire) formed of, for example, metal or resin. Although two vibration transmitting members 56 are illustrated in FIG. 6, first vibrating body 71 and second vibrating body 72 may be connected by three or more vibration transmitting members 56 disposed at equal intervals along the peripheral edge of second vibrating body 72. This leads to more stable support of second vibrating body 72 by first vibrating body 71.

With this configuration, for example, the illumination light emitted toward second vibrating body 72 from first vibrating body 71, which is the disc-shaped light-emitting device 75, is less likely to be cut off by the plurality of vibration transmitting members 56. That is, speaker device 10*c* having the lighting function of emitting illumination light can emit illumination light with almost no shadow.

Each of the plurality of vibration transmitting members 56 may not be a string (wire) but may be a plate-shaped shade formed of transparent or milky white resin, for example. One shade configured to cover first vibrating body 71 and second vibrating body 72 may connect first vibrating body 71 and second vibrating body 72. In other words, a shade provided in vibrating body 70*b*, which is the lighting fixture, may function as a member for mechanically connecting first vibrating body 71 and second vibrating body 72.

Other Embodiments

As above, the embodiment and the variations thereof have been described as examples of the technique disclosed in the present application. However, the technique in the present disclosure is not limited thereto but can be applied to embodiments and variations in which changes, substitutions, additions, omissions, and the like have been made as appropriate. It is also possible to form a new embodiment by combining each of the components described in the above embodiment and variations. Therefore, other embodiments will be illustrated below.

For example, it is not essential for speaker device 10 to be mounted on rail member 100. For example, speaker device 10 may be directly mounted on an adapter for a lighting fixture provided in ceiling 111. Speaker device 10 may be mounted on the wall surface of ceiling 111 or the like with screws or the like. In this case, speaker device 10 may receive electric power supply for driving first actuator 40*a* or the like from, for example, an outlet installed on the wall surface.

The shape and size of each member of speaker device 10 are not limited to the shape and size illustrated in FIG. 1 and the like. For example, the shape of vibrating body 60 in plan view need not be a circle but may be an ellipse having a major diameter and a minor diameter or a polygon such as a rectangle. Vibrating body 60 need not be thin as illustrated in FIG. 2, for example. For example, illuminator 65 and vibrating body main body 61 may be spaced apart from each other in the Z-axis direction. In this case, for example, one vibrating body can be formed by fixing illuminator 65 and vibrating body main body 61 at positions away from each other and providing a cover (shade) for covering at least illuminator 65 from above. Vibrating body 60 need not have a flat shape in the Z-axis direction. As the overall shape of vibrating body 60, various shapes such as a sphere or a cube can be employed. However, with the vibration direction of vibrating body 60 being the Z-axis direction, the larger the plane of vibrating body 60 perpendicular to the Z-axis direction (the plane with its normal line parallel to the Z-axis), the more desirable it is from the viewpoint of high efficiency in sound generation.

The outer diameter and the length of vibration transmitting member 50 are not particularly limited. For example, when the length of vibration transmitting member 50 in the axial direction (the Z-axis direction in the embodiment) is relatively short, the outer diameter of vibration transmitting member 50 may be larger than the length in the axial direction. For example, the length of vibration transmitting member 50 may be adjustable.

The number of vibration transmitting members 50 connecting first actuator 40*a* and vibrating body 60 may be two or more. For example, in FIG. 3, a plurality of vibration transmitting members 50 may be disposed side by side in the X-axis direction or the Y-axis direction on diaphragm 46 of first actuator 40*a*.

Speaker device 10 need not include second actuator 40*b*. For example, in a case where the maximum sound volume required for speaker device 10 is relatively small or some other case, when first actuator 40*a* is relatively small, second actuator 40*b* for canceling unnecessary vibration may be omitted.

It is not essential for first actuator 40*a* and second actuator 40*b* to be disposed in the opposite direction and side by side in the Z-axis direction. For example, second actuator 40*b* may be disposed on the side of first actuator 40*a* in the X-axis direction in FIG. 3 with diaphragm 46 of second actuator 40*b* facing the Z-axis plus direction. Even in this case, by collectively constraining first actuator 40*a* and second actuator 40*b* with a rigid body such as a metal plate or the like, the vibration applied by first actuator 40*a* to main body part 20 can be reduced by the vibration of second actuator 40*b*.

Various supplementary matters for speaker device 10 according to the embodiments described above may be applied to each of speaker devices 10*a* to 10*c* according to Variations 1 to 3.

As above, the embodiments (including variations) have been described as examples of the technique in the present disclosure. To that end, the accompanying drawings and detailed description have been provided. Accordingly, the components described in the accompanying drawings and the detailed description may include not only components that are essential for solving the problem but also components that are not essential for solving the problem in order to illustrate the above technique. Therefore, the fact that those non-essential components are described in the accompanying drawings or detailed description should not immediately lead to a finding that those non-essential components are essential.

The embodiments described above are intended to illustrate the technique of the present disclosure, and hence various changes, substitutions, additions, and omissions may be made within the scope of the claims or equivalents thereof.

INDUSTRIAL AVAILABILITY

The present disclosure is applicable to a speaker device that outputs sound based on an input audio signal and is mounted at a predetermined position of a ceiling or the like.

The invention claimed is:

1. A speaker device comprising:

a main body part mounted at a predetermined position;

a first actuator that is housed in the main body part and generates vibration corresponding to an audio signal that is input;

a vibrating body that vibrates with vibration transmitted from an outside to generate sound; and a first vibration transmitting member having a string shape or a rod shape, the first vibration transmitting member transmitting the vibration generated by the first actuator to the vibrating body, wherein the vibrating body is placed for hanging from the first actuator by the first vibration transmitting member, the vibrating body includes an illuminator that emits illumination light, and the first vibration transmitting member includes an electric wire that supplies the first actuator with electric power for the first actuator to operate.

2. The speaker device according to claim 1, wherein the main body part includes a mounting member for mounting the main body part on a rail member fixed to a ceiling, the mounting member moving along a longitudinal direction of the rail member and receiving electric power supply from the rail member.

3. A speaker device comprising:

a main body part mounted at a predetermined position;

a first actuator that is housed in the main body part and generates vibration corresponding to an audio signal that is input;

a vibrating body that vibrates with vibration transmitted from an outside to generate sound; and a first vibration transmitting member having a string shape or a rod shape, the first vibration transmitting member transmitting the vibration generated by the first actuator to the vibrating body, wherein the vibrating body is placed for hanging from the first actuator by the first vibration transmitting member, and the main body part further houses a second actuator that generates vibration corresponding to the audio signal in a direction opposite to a direction of the vibration generated by the first actuator.

4. The speaker device according to claim 3, further comprising a weight member that vibrates with the vibration of the second actuator and has a weight corresponding to a weight of the vibrating body.

5. The speaker device according to claim 3, wherein the main body part includes a mounting member for mounting the main body part on a rail member fixed to a ceiling, the mounting member moving along a longitudinal direction of the rail member and receiving electric power supply from the rail member.

6. A speaker device comprising:

a main body part mounted at a predetermined position;

a first actuator that is housed in the main body part and generates vibration corresponding to an audio signal that is input;

a vibrating body that vibrates with vibration transmitted from an outside to generate sound; and a first vibration transmitting member having a string shape or a rod shape, the first vibration transmitting member transmitting the vibration generated by the first actuator to the vibrating body, wherein the vibrating body is placed for hanging from the first actuator by the first vibration transmitting member, and the vibrating body includes:

a first vibrating body connected to the first vibration transmitting member;

a second vibrating body disposed below the first vibrating body; and a second vibration transmitting member having a string shape or a rod shape, the second vibration transmitting member connecting the first vibrating body and the second vibrating body and transmitting the vibration generated by the first actuator to the second vibrating body.

7. The speaker device according to claim 6, wherein the main body part includes a mounting member for mounting the main body part on a rail member fixed to a ceiling, the mounting member moving along a longitudinal direction of the rail member and receiving electric power supply from the rail member.

* * * * *